United States Patent
Bazar (10) Patent No.: US 8,254,339 B2
(45) Date of Patent: Aug. 28, 2012

(54) RECEIVER APPARATUS AND METHOD FOR RELEASING MEMORY THEREOF

(75) Inventor: Isman Bazar, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 868 days.

(21) Appl. No.: 11/632,076

(22) PCT Filed: Jul. 7, 2005

(86) PCT No.: PCT/JP2005/012560
§ 371 (c)(1),
(2), (4) Date: Jan. 10, 2007

(87) PCT Pub. No.: WO2006/006485
PCT Pub. Date: Jan. 19, 2006

(65) Prior Publication Data
US 2007/0233721 A1    Oct. 4, 2007

(30) Foreign Application Priority Data
Jul. 12, 2004    (JP) ................................. 2004-204258

(51) Int. Cl.
*H04B 7/216*    (2006.01)
(52) U.S. Cl. ........ 370/335; 370/328; 370/370; 370/230; 370/395.2; 370/395.4; 370/395.42; 370/412; 370/413; 370/429
(58) Field of Classification Search ............. 370/328, 370/335, 370, 395.2, 230, 395.42, 412, 413, 370/429
See application file for complete search history.

(56) References Cited

U.S. PATENT DOCUMENTS

| | | | |
|---|---|---|---|
| 2003/0123392 A1* | 7/2003 | Ruutu et al. | 370/235 |
| 2003/0210669 A1* | 11/2003 | Vayanos et al. | 370/335 |
| 2004/0037224 A1* | 2/2004 | Choi et al. | 370/235 |
| 2004/0071086 A1* | 4/2004 | Haumont et al. | 370/230 |
| 2004/0071127 A1* | 4/2004 | Hurtta | 370/349 |
| 2004/0120284 A1* | 6/2004 | Terry et al. | 370/329 |
| 2004/0177307 A1* | 9/2004 | Chao | 714/752 |
| 2005/0050221 A1* | 3/2005 | Tasman et al. | 709/232 |

FOREIGN PATENT DOCUMENTS

| | | |
|---|---|---|
| JP | 2001-186181 | 7/2001 |
| JP | 2003 264607 | 9/2003 |
| JP | 2003 283596 | 10/2003 |
| WO | 03 096617 | 11/2003 |
| WO | WO 03/096617 A3 | 11/2003 |

* cited by examiner

*Primary Examiner* — Dwayne Bost
*Assistant Examiner* — Edward Zhang
(74) *Attorney, Agent, or Firm* — Oblon, Spivak, McClelland, Maier & Neustadt, L.L.P.

(57) ABSTRACT

In a receiver apparatus of HSDPA (High Speed Downlink Packet Access) data transmission scheme, it is achieved to minimize the occurrence of the system performance degradation and problems caused by TSN flash execution. In the receiver apparatus, each of a plurality of reordering buffers that temporarily store received traffic data is ranked on the basis of QoS information of the traffic data. When it is determined that memory release of the reordering buffers is necessary, the memory release is performed from the lowest ranked reordering buffer.

14 Claims, 8 Drawing Sheets

RECEIVER APPARATUS AND METHOD FOR RELEASING MEMORY THEREOF

TECHNICAL FIELD

The present invention relates to a receiver apparatus employing a HSDPA (High Speed Downlink Packet Access) data transmission scheme in a UMTS (Universal Mobile Telecommunication System) system, and a method of releasing its memory.

Figure 1:
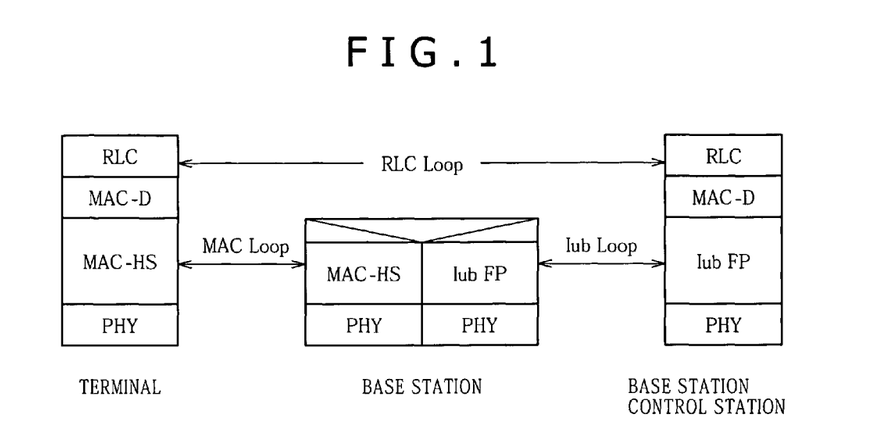
FIG. 1 is a diagram showing an RAN protocol stack (radio interface protocol structure) and a resending element of HSDPA.

In recent years, in the mobile communications field, there has been an increasing need for high-speed data transmission in order to realize applications, such as high-speed Internet download and streaming. In the standardization organization 3GPP which considers the third generation mobile communication system, high-speed down-link packet access (High Speed Downlink Packet Access: HSDPA) is additionally defined as a method of improving a transmission rate of data from a base station to a mobile device (down-link). With this HSDPA technology, transmission scheduling of down-link data is provided on a base station side as part of reduction in a total delay and improvement in speed of data transmission/reception within a radio access network (Radio Access Networks: RAN). In a RAN protocol stack (radio interface protocol structure) of HSDPA as shown in FIG. 1, the transmission scheduling of this down-link is specified as part of media access control for high speed (MAC-HS: Media Access Control for High Speed) layer newly defined according to HSDPA.

On the other hand, as for a terminal side, MAC-HS on the terminal side is similarly specified as a peer entity (Peer Entity) of MAC-HS on the base station side. In FIG. 1, MAC-HS on the terminal side is provided with a function to guarantee transmission in a sequence of receiving data order number (In-Sequence Delivery) to a radio link control (RLC: Radio Link Control) protocol located in a higher layer of MAC-HS.

Figure 3:
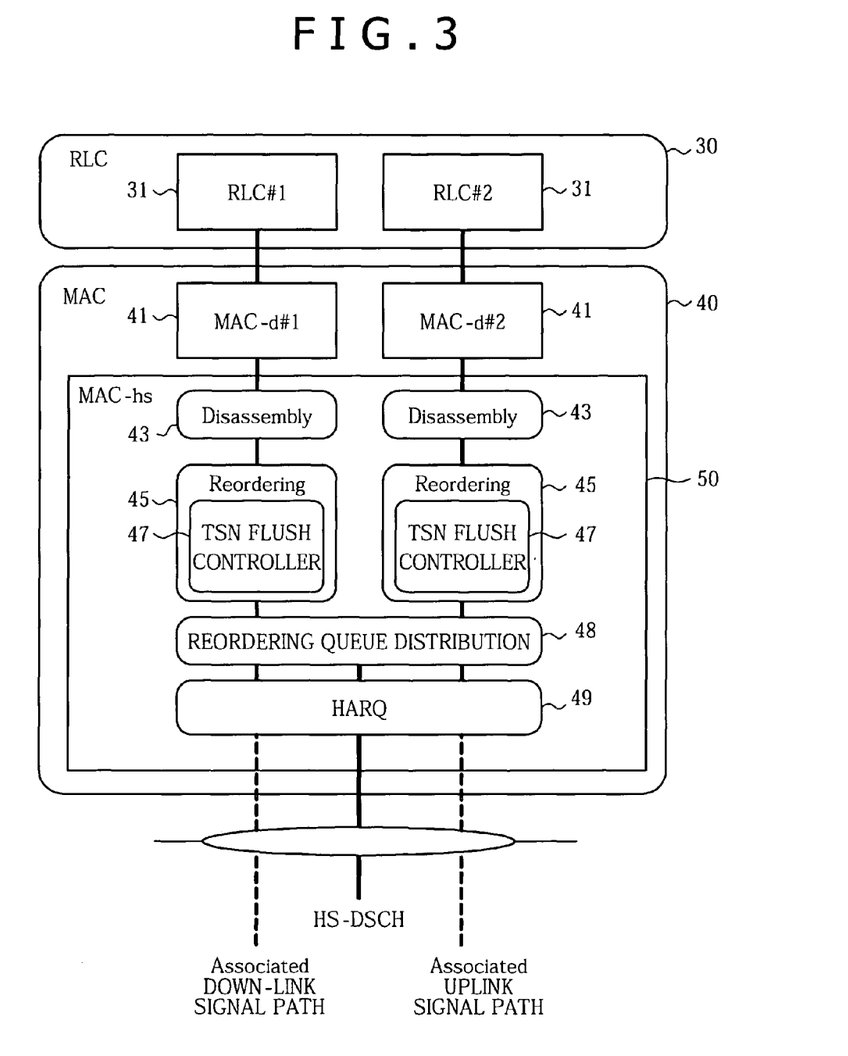
FIG. 3 is a diagram showing an entity which constitutes a MAC-HS layer on the terminal side, and an entity which controls a TSN flush process assumed in the present invention.

FIG. 3 shows an entity which constitutes a MAC-HS layer on the terminal side and an entity which controls a transmission sequence number (TSN: Transmission Sequence Number) flush process which is assumed in the present invention. HARQ entity 49 in MAC-HS 50 carries out a process of decoding a received transport block (TB), and assembles MAC-HS PDU data (PDU: Protocol Data Unit). If the decoding process is successful, it transmits a delivery acknowledge of the HARQ entity 49 to the base station side, and transmits the decoded data to a reordering queue distribution (Reordering Queue Distribution) entity 48. The reordering queue distribution entity 48 specifies a reordering buffer according to a queue ID (QID) in a MAC-HS PDU header. The reordering entity 45 carries out a process of sorting data with respect to each reordering buffer. A disassembly (Disassembly) entity 43 disassembles MAC-HS PDU set in numerical order (In-Sequence) into Media Access Control for Dedicated (MAC-D) PDU, and transmits data to RLC 30 (entity 31) through MAC-D 41 on the basis of a multiplexed logical channel.

The reordering entities 45 respectively include TSN flush control units (TSN Flush Controller) 47 which constitute a principal part of the present invention. Operation of this TSN flush control unit 47 will be described later.

In order to guarantee "In-Sequence Delivery" to RLC 30, the MAC-HS 50 on the terminal side buffers once and sorts downstream MAC-HS PDU received at every TTI (Transmission Time Interval). In other words, on the basis of the transmission sequence number (TSN) given as the MAC-HS PDU header, the MAC-HS 50 on the terminal side sorts TSN's of the data to be buffered so that they may be in order.

Figure 4:
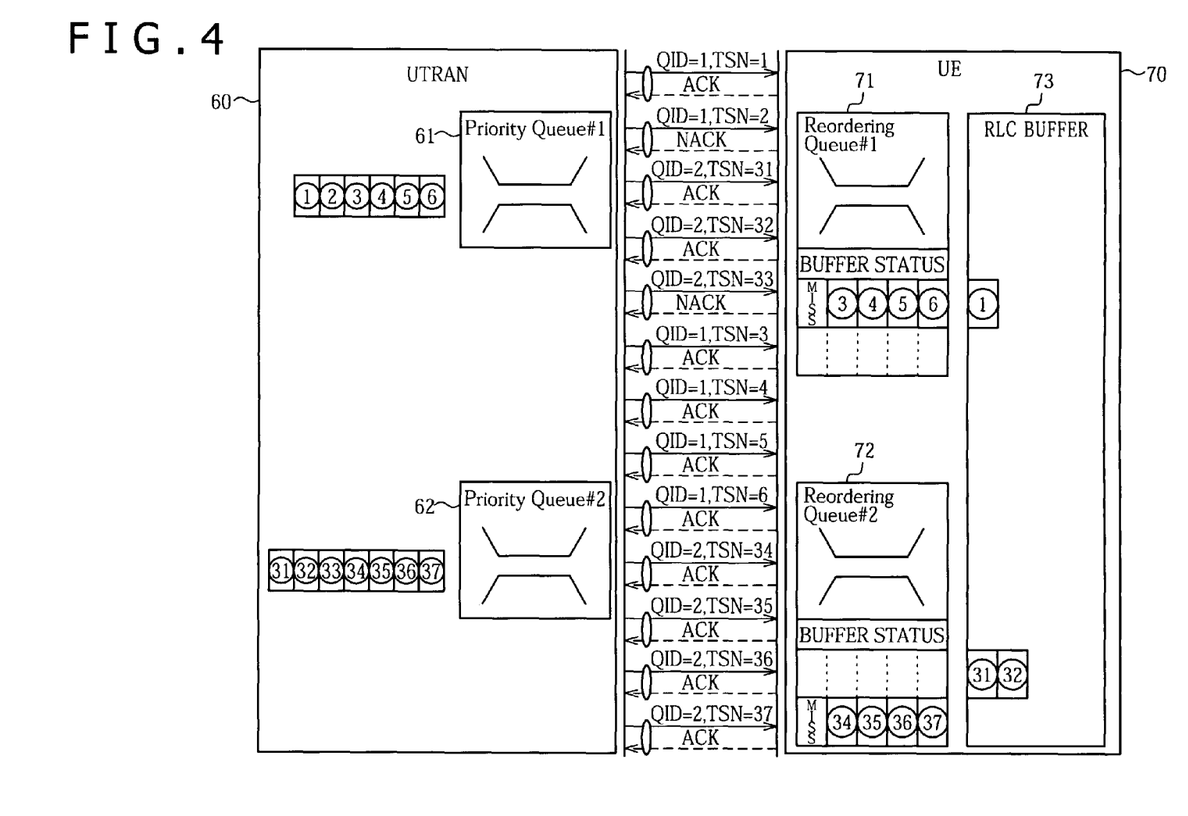
FIG. 4 illustrates a receiving example showing a situation of buffering of the reordering buffer due to data missing.

In a case where a preceding TSN is missing, the reordering entity 45 stores, in a reordering buffer, a following TSN which is already received whilst waiting for the preceding TSN. An example of a buffering situation (accumulation) in the reordering buffer due to the data missing is shown in FIG. 4. This figure illustrates a situation where the down-link data are transferred from a UMTS terrestrial radio access network (UTRAN: UMTS Terrestrial Radio Access Network) 60 to UE (User Equipment) 70, and a response corresponding thereto. Reordering queues (Reordering Queue #1, #2) 71 and 72 (only two pieces are shown here) in UE 70 constitute the reordering buffer. Data blocks outputted from priority queues 61 and 62 (Priority Queue #1, #2) in UTRAN 60 are provided with queue identification data (QID) and TSN's, and stored in the reordering queue 71 and 72 corresponding to the respective QID's. However, in this example, responses of UE 70 to the data transfer of QID=1, TSN=2 and QID=2, TSN=33 are NACK. For this reason, the data blocks after TSN which is missing in the reordering buffer are accumulated. The data blocks which are In-Sequence before the missing TSN are transferred to an RLC buffer 73.

Although the data block of the missing TSN is arranged to be resent, there may be a case where an expected TSN are not be resent including a case the base station side mistakes NACK for ACK because of a certain fault, a case where the number of times of resending exceeds a specified value, and so on. In such a case, if a MAC-HS protocol continues waiting forever, operation of the protocol stops and it falls in a mixture state (Stall).

As for 3GPP, such a stall is avoided by way of a combination of restriction of waiting time (T1 timer based) and a reception window width (window based).

Further influence of the data missing is that the data are accumulated in the reordering buffer as described above until they are in numerical order (In-Sequence). If such situations take place frequently, a lower layer memory is consumed considerably, since the received data cannot be passed to a higher protocol immediately. The terminal side starts a memory release procedure in a case where a memory for the newly received data cannot be secured, that is, in a case where it is detected that L2 (layer 2) has an insufficient memory. The lower layer memory for the reordering buffer is specified as a capability barometer of the terminal, and is a precious resource.

It is noted that Japanese Patent Application Publication (KOKAI) No. 2003-264607 and Japanese Patent Application Publication (KOKAI) No. 2003-283596 disclose sorting of the data buffered by MAC-HS on the terminal side in a high-speed down-link packet connection system.

In 3GPP, the reordering buffer is secured in an L2 memory domain and the whole size of the L2 memory is defined as a UE capability parameter (User Equipment Capability Parameter) of each terminal class. The release procedure (TSN flush: TSN Flush procedure) for the memory in use is arranged in accordance with a specification, which should be performed when the insufficient memory takes place in the L2 memory, and the terminal can start and carry out the execution of this release procedure autonomously, without an intervening network.

The TSN flush procedure is a procedure in which a primary purpose is to secure a memory domain fundamentally, and which is final solution means for a case where a trouble arises. In other words, it is desirable to avoid the execution of the TSN flush as much as possible from a system viewpoint since a data throughput is considerably influenced, and to suppress the influence to be the minimum when executing at the time of the trouble. Therefore, now, a method of minimizing impact is proposed in consideration of an element which influences a system throughput in a case where the TSN flush is carried out.

In particular, a decrease in the system throughput due to the TSN flush takes place because of the following factors.
1. Out of synchronization with down-link scheduling
2. Increase in the number of times of RLC resending
3. Data decoding error due to asynchronism of HFN (Hyper Frame Number)

Down-link data scheduling is mainly performed on the basis of quality of services (QoS: Quality of Service) of traffic data. In other words, higher rank QoS traffic data are relatively preferentially subjected to down-link transmission. If the higher QoS rank traffic data are flushed early when the buffer is insufficient, higher QoS resending data to be delivered preferentially are considered as already received data, and probably discarded in the terminal side, resulting in a waste of a resource.

Secondly, the increase in the number of times of the RLC resending occurs such that the TSN flush basically gives priority to securing of the memory domain, the delivery to the higher layer is carried out without guaranteeing "In-Sequence Delivery". In other words, since the delivery to an RLC layer is carried out without re-receiving the missing data, a process of resending the missing data occurs frequently in the RLC layer. Although the resending of the RLC layer is operationally permitted, it is desirable to minimize the occurrence frequency thereof in terms of decreasing the HSDPA throughput with increasing RAN total delay. The RLC resending (RLC Loop) leading to the RAN total delay, MAC-HS resending (MAC-HS Loop), and an Iub element (Iub Loop) on the network side are as shown in FIG. 1. As can be seen from FIG. 1, when the RLC loop occurs, since the transmission/reception to/from the RNC side is performed, both Iub Loop and MAC-HS Loop occur, thus the total delay becomes large.

Thirdly, there is a possibility that HFN asynchronism may take place associated with loss of continuation MAC-HS PDU due to shortness (0-127) of a Sequence Number (SN) period of RLC UM (Unacknowledge Mode). Assuming a case of the delivery of the RLC layer by way of the TSN flush, HFN asynchronism may occur in a case where two or more missing MAC-HS PDU are included. It may happen because the number of PDU of RLC UM to be multiplexed to 1 MAC-HS PDU can be up to 70 according to the current specification of 3GPP.

In view of the above, in a case where there are a plurality of reordering buffers, the buffer selection as to from which buffer should be subjected to the TSN flush and a memory size of the buffer to be flushed are factors which affect the HSDPA throughput, thus it is necessary to optimize the factors.

The present invention is made in such a background and aims to provide a memory release method which can inhibit and minimize a drop in performance and generation of faults in a system due to TSN flush execution in the receiver apparatus of the HSDPA (High Speed Downlink Packet Access) data transmission system, and the receiver apparatus.

DISCLOSURE OF THE INVENTION

A memory release method in accordance with the present invention is a memory release method in a receiver apparatus of HSDPA (High Speed Downlink Packet Access) data transmission scheme, characterized by having a step of ranking each of a plurality of reordering buffers into which traffic data to receive are temporarily stored, on the basis of QoS information on the traffic data stored in the reordering buffer, a step of judging that the reordering buffer needs memory-release, and a step of releasing a memory from a lowest ranked one of the ranked reordering buffers when it is judged that the memory-release is necessary.

According to the present invention, each reordering buffer is ranked on the basis of the QoS information on the traffic data, and, at the time of releasing the memory of the reordering buffer, the memory release is performed from the one ranked lowest so that the memory release is carried out from the reordering buffer with a lower priority according to the QoS information.

The memory size of the memory to be released is preferably determined in accordance with an operation mode of RLC (Radio Link Control). Thus, the memory release for a suitable memory size is realized in accordance with the operation mode.

A receiver apparatus according to the present invention is a receiver apparatus of a HSDPA (High Speed Downlink Packet Access) data transmission scheme, characterized by including ranking means for ranking each of a plurality of reordering buffers into which traffic data to receive are temporarily stored on the basis of QoS information on the traffic data stored in the reordering buffer, judgment means for judging that the reordering buffer needs memory-release, memory release means for releasing a memory from lowest ranked one of the ranked reordering buffers when it is judged that the memory-release is necessary, and allocating means for allocating the reordering buffer, whose memory is released, to be used for new reception data.

The above ranking means ranks each reordering buffer under a predefined rule, or by using the QoS information on a PDP context on which the receiver apparatus and a network agree and by judging matching of the plurality of reordering buffers to the QoS information. When detecting a situation where an amount of each of the reordering buffers used exceeds a specified value, the above judgment means judges that it is necessary to release the memory. The above memory release means releases a memory from the lowest ranked one of the ranked reordering buffers. It is preferable that the size of the memory to be released is determined in accordance with the operation mode of RLC (Radio Link Control). The above allocating means allocates the reordering buffer, whose memory is released, to be used for the new reception data.

By performing the TSN flush of the present invention, it is possible to synchronize with a transmission policy of priority scheduling on the base station side, to inhibit a drop in performance of the system due to the TSN flush execution, and to prevent generation of faults. In particular, the following effects can be obtained.
1. Since the memory is released from a buffer with lower priority, the influence to the system throughput is reduced.
2. The number of times of RLC resending is reduced.
3. A possibility of HFN asynchronism is eliminated.

BEST MODE FOR IMPLEMENTING THE INVENTION

Hereafter, preferred embodiments of the present invention will be described in detail.

Figure 9:
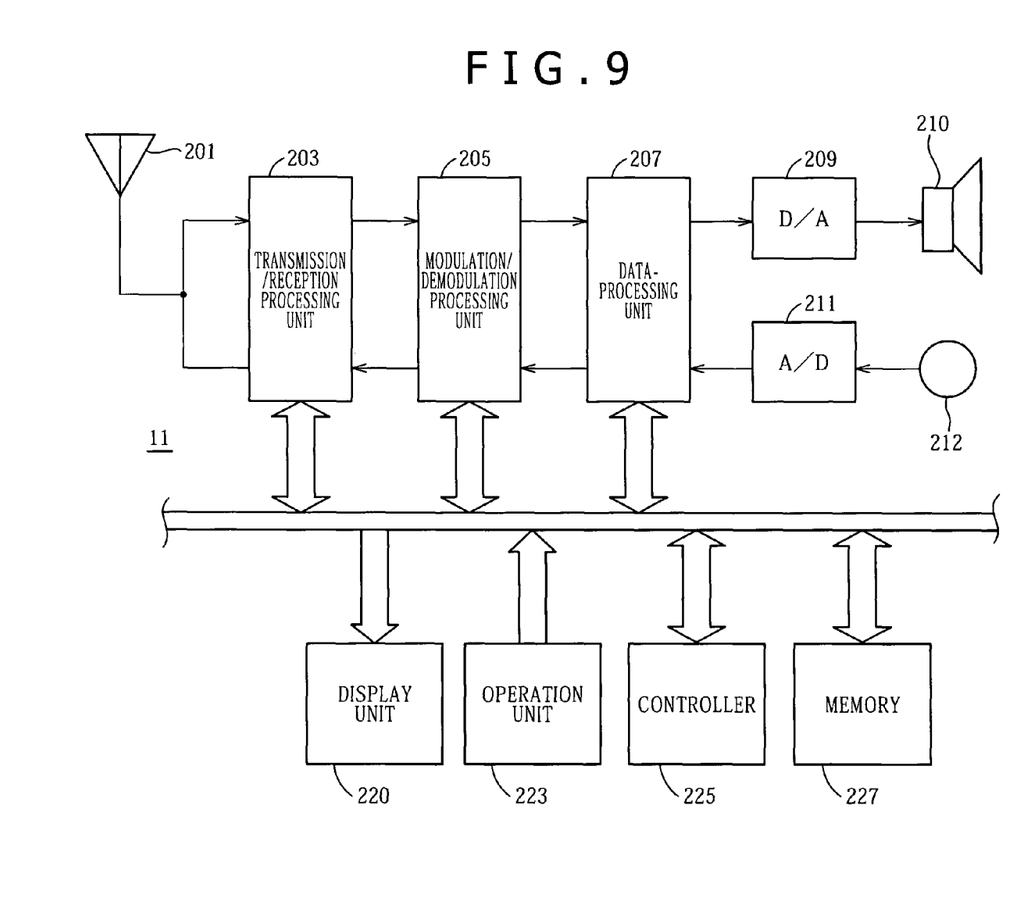
FIG. 9 is a block diagram showing an outline of a hardware structure of a mobile communication terminal apparatus including a receiver apparatus of the present invention.

FIG. 9 is a block diagram showing an outline of a hardware structure of a mobile communication terminal apparatus (hereafter referred to as terminal) 11 including a receiver apparatus of the present invention. This terminal 11 is provided with an antenna 201, a transmission/reception processing unit 203, a modulation/demodulation processing unit 205, a data-processing unit 207, a D/A converter 209, a speaker 210, an A/D converter 211, and a microphone 212 as elements peculiar to a mobile phone. Further, the terminal 11 has a controller 225 including a CPU, a ROM, etc. for controlling each of the elements, a memory 227 used as a work space or a temporary data storage area by this controller 225, a display unit 220 including a liquid crystal display device which functions as a user interface, etc., and an operation unit 223 corresponding to various operation keys, etc. The above L2 memory is secured in the memory 227.

A structure of MAC and RLC in the present embodiment is as shown in FIG. 3. The present embodiment has a characteristic feature in operation of a TSN flush control unit 47 in the reordering entity. The TSN flush control unit 47 is constituted with a CPU section of the controller 225 of FIG. 9.

Figure 2:
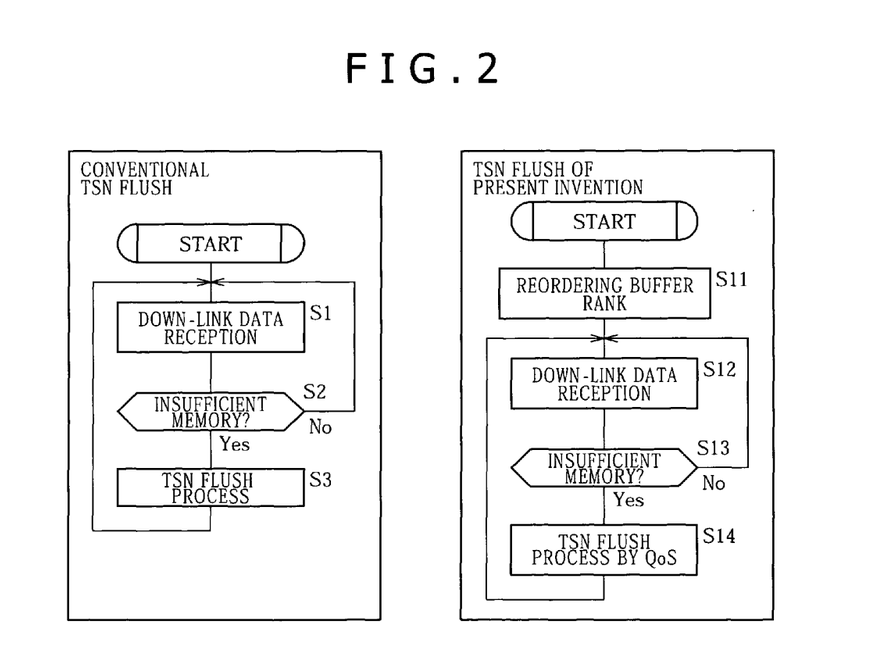
FIG. 2 is a diagram showing a fundamental difference between a conventional TSN flush and that of the present invention.

Here, referring to FIG. 2 a difference between the outline structures of a TSN flush of a conventional technology and that of the present invention will be described. Conventionally, when the memory is insufficient (S2) while receiving down-link data (S1), the TSN flush is performed and an empty domain in the memory is simply secured (S3). On the other hand, in the present invention, on completion of RB setup, the reordering buffer is beforehand ranked in advance of reception of the down-link data in accordance with QoS of traffic data (S11). When the memory runs short (S13), during reception of the down-link data (S12), the TSN flush process is performed from the lowest ranked reordering buffer (S14). Since the ranking of the reordering buffer is performed according to QoS, this TSN flush process also corresponds to QoS.

It is noted that, after selecting the reordering buffer, the memory size of the buffer to be flushed is determined in an effort to reduce the number of times of resending and to maintain HFN synchronism, in consideration of the operation mode of the higher protocol, which will be described in detail later.

As described above, in order to perform the TSN flush based on the QoS information on the traffic data, the reordering buffer is ranked according to the QoS information on the traffic data stored in each reordering buffer. However, the conventional scheduling of HSDPA down-link data is a function on the base station side, and which traffic data are to be mapped to which buffer depends on network provision. According to the specification of 3GPP Release5 (R5) which is the initial HSDPA release, since the network does not explicitly notify which QoS's traffic data are stored by the terminal side into each reordering buffer in the terminal, which cannot be known.

In a procedure of establishing the reordering buffer which has a one-to-one relationship with a priority queue (Priority Queue) on the network side, characteristics and attributes (Attributes) of each reordering buffer are notified by the network side to the terminal by using an information element of Added or Reconfigured DL TrCH information. However, mapping information on QoS of the traffic data and the buffer is not notified to the terminal.

In view of the current specification of 3GPP Release5, the present invention proposes the following two methods, in order that the terminal may know QoS of the traffic data stored in each reordering buffer, even if there is no explicit notice (via Signaling).

1. Mapping between QoS of the traffic data and the buffer is performed in compliance with a known rule.
2. The terminal autonomously performs the mapping between QoS of the traffic data and the buffer.

According to the method 1, a portion in which the mapping between QoS of the traffic data and the buffer is currently dependent on the network provision is mapped under a predetermined known rule so that the terminal side inevitably understands a mapping relationship, thus it is possible to rank a reordering buffer.

Figure 5:
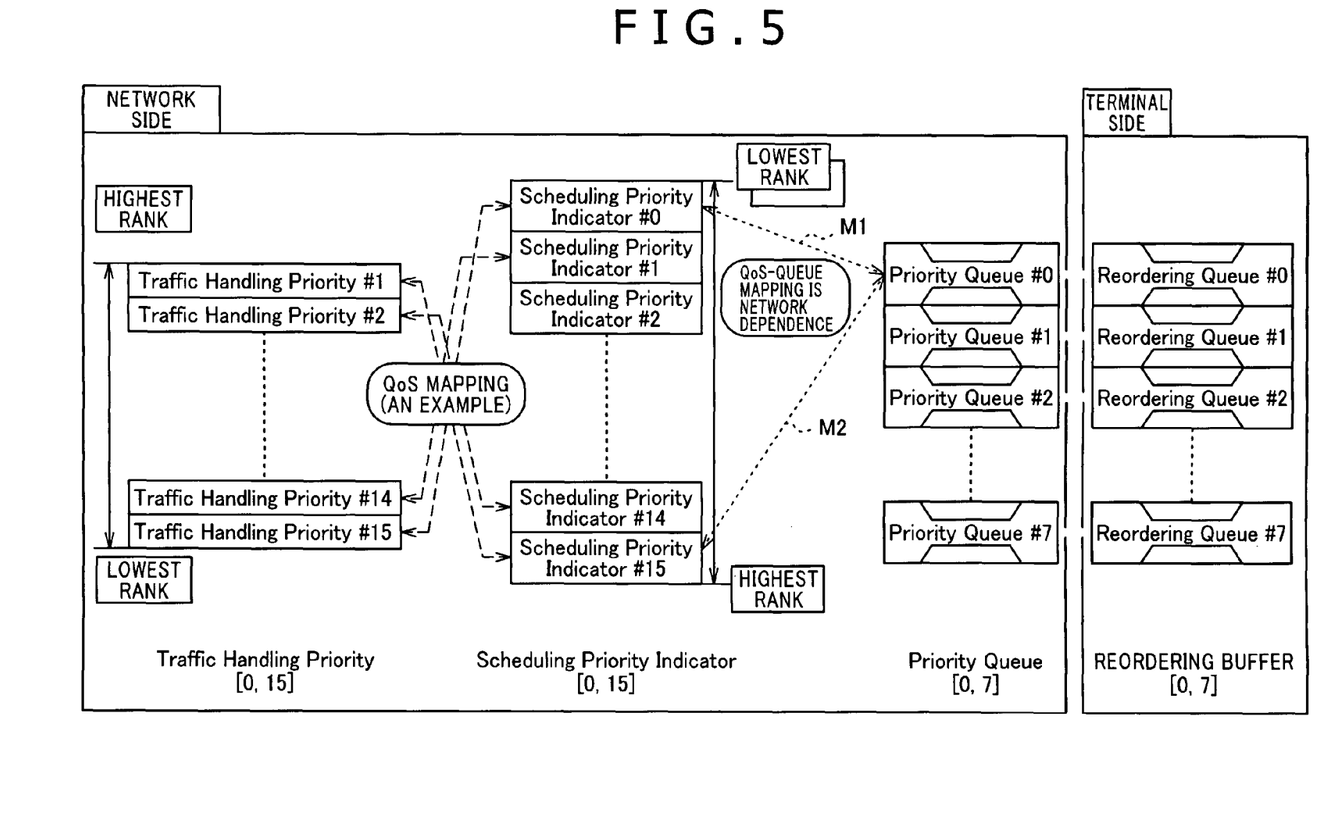
FIG. 5 is a diagram showing an example of horizontal mapping between QoS of traffic data and the buffer.

Currently, according to the 3GPP specifications, QoS of the traffic data and the buffer can be mapped, as shown in FIG. 5. In this mapping method, mapping between a scheduling priority identifier (Scheduling Priority Indicator) (equivalent to QoS information) and a priority queue (Priority Queue) can be performed arbitrarily (both dotted lines M1 and M2 are possible). Therefore, the terminal side cannot understand a mapping situation of QoS, unless it receives information as to which QoS is mapped to which buffer.

According to the present invention, the mapping is carried out by way of a specific pattern (for example, lower priority scheduling data are always mapped to the priority queue of a lower number ID), so that a relationship between the reordering buffer and QoS information is inevitably derived on the terminal side. This mapping is carried out semi-statically (Semi-Static). In a case of changing the relationship, it is notified to the terminal side by means of an explicit signal (Signaling). The reordering buffer is ranked on the basis of the mapping information. It is noted here that by "semi-static" means that a mapping state is fixed unless an instruction of the change is explicitly issued during an interval between establishment and release of a call.

According to the method 2, the mapping between the reordering buffer and QoS is carried out autonomously and in semi-static on the terminal side by using the QoS information on which the terminal and the network agree when establishing the call. The call establishment of HSDPA begins with a packet data protocol (Packet Data Protocol: PDP) context establishment procedure. In the PDP context establishment, negotiation with each radio bearer (Radio Bearer) as to the QoS information which can be offered between the terminal and the network is carried out. The reordering buffer is ranked by using the following items out of "QoS Attributes (QoS attributes)" specified under TS24.008 of 3GPP.

TABLE 1

QoS ATTRIBUTES USED FOR RANKING REORDERING BUFFER

| QoS Attributes | USAGE |
|---|---|
| Traffic Class | Specify Type of Application ("streaming", "interactive", "background") |
| Traffic Handling Priority | Indicate Relative Priority of Each RB in Interactive Services [0, 15]; (0: Logical Error, 1: Highest-15: Lowest) |
| Maximum Bit Rate | Maximum Communication Speed (0 Kbps ~) |

In view of values of such QoS attributes, the reordering buffer is ranked. The following examples show the values and the rank of the buffer of each attribute.

TABLE 2

EXAMPLE OF RANKING REORDERING BUFFER

| Rank of Reordering Buffer | Traffic Class | Traffic Handling Class | Maximum Bit Rate |
|---|---|---|---|
| 0 (Highest) | Interactive | 1 | — |
| 1 | Streaming | — (*1) | — |
| 2 | Interactive | 2-4 | — |
| 3 | Interactive | 5-7 | — |
| 4 | Interactive | 8-10 | — |
| 5 | Interactive | 11- | — |
| 6 | Background | — (*1) | High |
| 7 (Lowest) | Background | — | Low |

(*1) In the case of Streaming and Background, this attribute value is not taken into account (DC: Don't Care), since there is no "traffic handling priority (Traffic Handling Priority)" information.

*1 In the case of Streaming and Background, this attribute value is not taken into account (DC: Don't Care), since there is no "traffic handling priority (Traffic Handling Priority)" information.

However, in the structure of 3GPP Release5, the QoS attribute is a parameter managed at a NAS (Non Access Stratum) layer, and the information is not transmitted at a MAC-HS level. Therefore, it is necessary for the TSN flush control unit 47 (FIG. 3) of the reordering entity to generate a relationship between the information and the reordering buffer.

Figure 6:
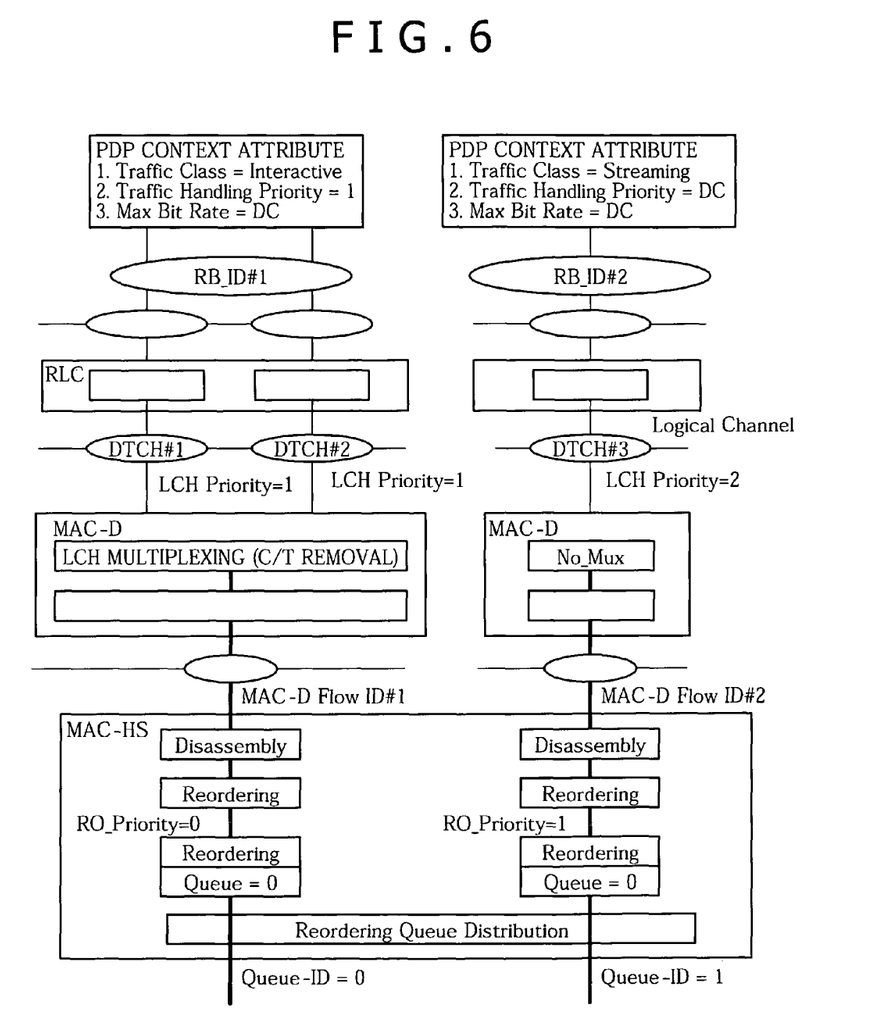
FIG. 6 is a chart showing an example of vertical mapping between QoS of the reordering buffer and the traffic data.

A mapping table which matches this QoS attribute to the reordering buffer can be generated in an example as shown in FIG. 6. As with this example, a relationship is fundamentally derived by using TrCH information and radio bearer (Radio Bearer) information. These information items are directed by the network at the time of requesting radio bearer (RB) setup. Therefore, the TSN flush control unit generates the mapping table after RB establishment for each reordering buffer established.

Figure 7:
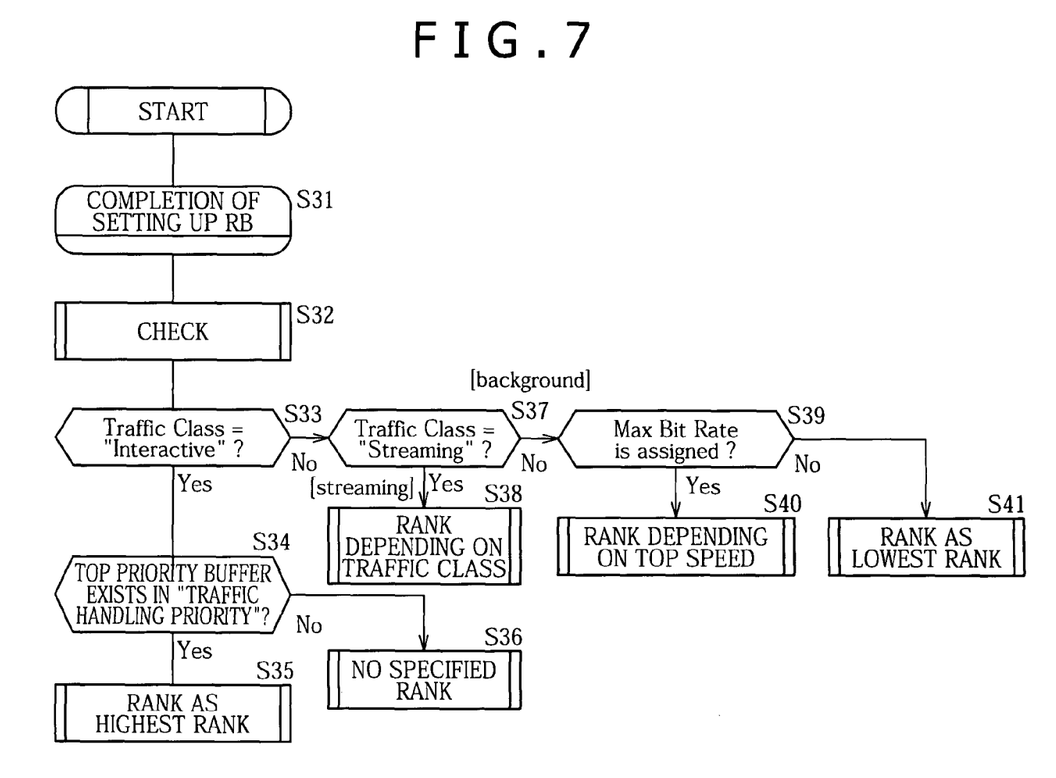
FIG. 7 is a flow chart in which each reordering buffer is ranked (provision of priority) in a preferred embodiment of the present invention.

After completing mapping table generation of the traffic data stored in each reordering buffer, each reordering buffer is ranked. FIG. 7 shows a flow chart in which the reordering buffer is ranked (provision of priority).

Fundamentally, a different traffic class is not mixed and stored in each reordering buffer. Therefore, after completion of RB setup (S31), a traffic class of RB mapped in each reordering buffer is judged first (S32). In an "Interactive" traffic class (S33, Yes), data transmission/reception have a characteristic in which response time to an access request is restricted. Therefore, if there is a reordering buffer which accommodates a high priority RB (example: Traffic Handling Priority=1) at "Traffic Handling Priority" as shown in the above-mentioned table 2 (S34, Yes), the highest rank (Rank 0) is provided to this buffer (S35). If there is not "Traffic Handling Priority" in step S34, a rank is not specified (S36).

If the traffic class is a "Streaming" class (S37, Yes), it is necessary to restrict delay distribution of each data stream, so that the buffer is located in the next rank (Rank 1) (S38).

On the other hand, a lower rank is provided to a service of a class "Interactive" having low "Traffic Handling Priority", or "Background" class (S34, S35, S39-S41). According to the example of Table 2, Rank 2 is provided for a value of 2-4 of "Traffic Handling Priority" of an "interactive" class, and Rank 3, Rank 4, and Rank 5 are respectively provided for those of 5-7, 8-10, and 11 or more.

Further, as for the "Background" class (S37, No), since the RB does not specify a "Traffic Handling Priority" attribute, the QoS attribute is calculated (S40), on the basis of the highest communication rate (Max Bit Rate) (S39, Yes) of correlation between RB's. If none of the above is applied, the lowest rank is provided for the buffer (S41). In the example of Table 2, when "Max Bit Rate" is "High", Rank 6 is provided and Rank 7 (lowest) is provided for "Low".

During processing down-link data reception, it is quite probable that received data are accumulated in the reordering buffer because of the data missing as shown in FIG. 4. In a case where this amount of buffered data exceeds the specified value, the TSN flush process is performed. The TSN flush based on QoS of the present invention is controlled by the TSN flush control unit 47 as mentioned above.

Figure 8:
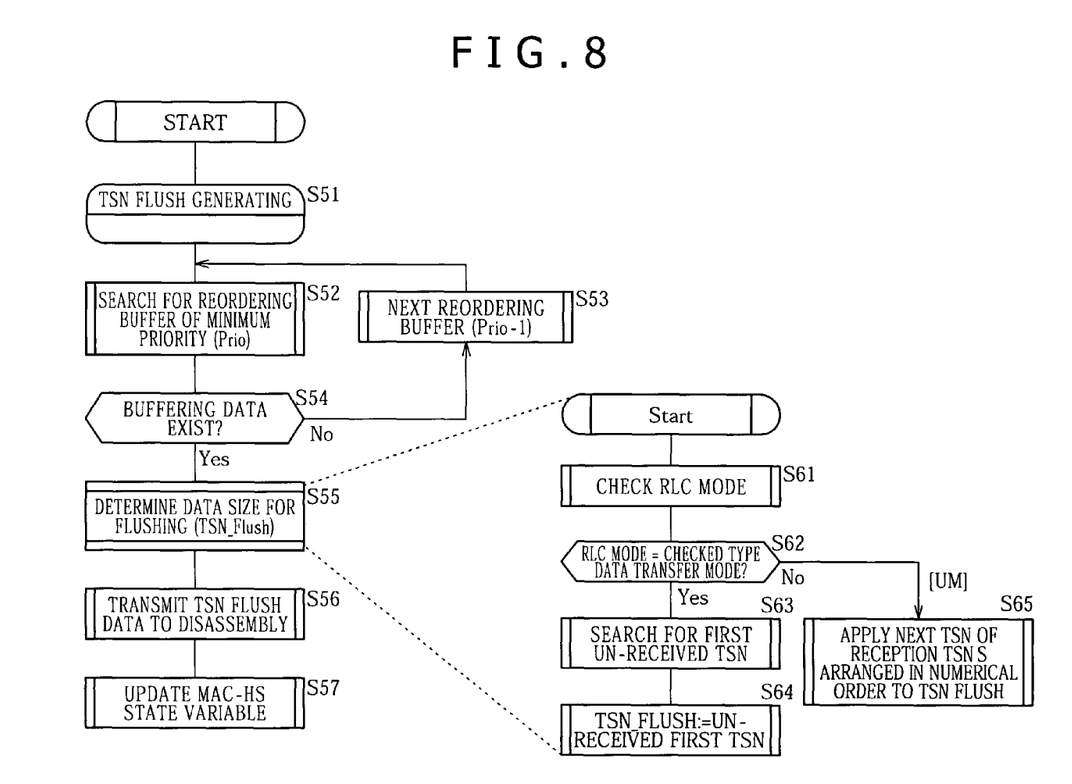
FIG. 8 is a flow chart of a process of performed by a TSN flush control unit.

FIG. 8 shows a flow chart of a process that the TSN flush control unit 47 carries out. This process includes the TSN flush process using the QoS information, and a process of determining a size (TSN_Flush) parameter of a memory to be released.

If a need for the TSN flush arises (S51), the TSN flush control unit 47 first searches for the reordering buffer (ID) of the lowest rank on the basis of a rank parameter held by each reordering buffer (S52). If there exists data buffered in the reordering buffer considered as the lowest rank (S54, Yes), the buffer is determined as a flush target. An advantage of carrying out the flush from the traffic data with a lower priority is that the flush operation synchronizes with operation of a data transmitting scheduler. In other words, in a case where there exist data with a higher priority, the down-link transmission for the lower priority data are tend to be carried out later. Therefore, there is less possibility that the lower priority data are set in the numerical order (In-Sequence) than the high priority data, thus there is no problem even if the flush can be performed preferentially.

Next, it is determined for the reordering buffer what memory size (data size) is required to be released (S55). Selection of a TSN_Flush parameter which specifies this memory size is carried out, in view of the conditions (Next_Expected_TSN<TSN_Flush<RcvWindow_UpperEdge +1) specified under 3GPP TS25.321 and in consideration of the operation mode of the RLC layer (S61). Here, "Next_Expected_TSN" represents the next TSN of the reception TSN's arranged In-Sequence. In other words, since the data are always In-Sequence, it represents TSN expected to be next out of TSN's of the currently received data. "RcvWindow_UpperEdge"represents TSN of the upper end of Receiver Window.

Firstly, in a case where RLC AM (Acknowledge Mode: acknowledge type data transfer mode) is applied (S62, Yes), the TSN flush control unit delivers only numerical order (In-Sequence) data so as to reduce resending frequency. In order to realize this, while a waiting timer (T1 timer) for the first missing data is started, the TSN flush control unit stores the first un-received TSN (First_Missing_TSN). By searching for this First_Missing_TSN (S63) and setting it up as the TSN_Flush parameter (S64), the data only in numerical order (In-Sequence) can be delivered.

On the other hand, in a case where RLC UM (Unacknowledge Mode: un-acknowledge type data transfer mode) is applied, there is no RLC resending function, thus it is not necessary to take into consideration the number of times of resending. Alternatively, in a case where the data to be delivered to RLC by way of the TSN flush contain a plurality pieces of missing data, it is quite probable that data corresponding to SN period (0-127) of RLC UM is missing. This missing corresponding to the SN period may be a cause of the asynchronism of HFN (Hyper Frame Number) used for secrecy. Since it has such serious influence, it is desirable to avoid the RLC delivery containing the plurality of lack data as much as possible. Therefore, according to the present invention, in the case of the RLC UM mode, a value which minimizes HFN asynchronism possibility is selected as the TSN_Flush parameter. In other words, the size of data to be subjected to the TSN flush once is reduced. For that purpose, it is arranged as TSN_Flush=Next_Expected_TSN+1, for example (S65).

On the basis of the TSN_Flush parameter, the TSN flush control unit starts the TSN flush process, and transmits the TSN flush data in the reordering buffer to the disassembly (Disassembly) entity 43 (S56). Specifically, the data specified with the TSN_Flush parameter is transmitted to the disassembly entity 43. Then, a MAC-HS state variable specified under TS25.321 is updated (S57).

Although the preferred embodiments of the present invention are described above, it is possible to perform various modifications and to make a change besides the above description.

The invention claimed is:

1. A memory release method in a receiver apparatus of HSDPA (High Speed Downlink Packet Access) data transmission scheme, comprising:
   receiving a plurality of data units from a transmitter apparatus, wherein each of the plurality of data units include a sequence number;
   storing the received plurality of data units in each of a plurality of reordering buffers of the receiver apparatus;
   reordering, by each of the plurality of reordering buffers, each of the plurality of data units based on the sequence numbers included in each of the plurality of data units;
   ranking each of the plurality of reordering buffers on the basis of Quality of Service (QoS) information indicating a traffic class of the data units stored in the reordering buffers;
   judging that said reordering buffers need memory-release;
   determining a size of memory to be released in accordance with an operation mode of RLC (Radio Link Control) by determining to release a first size of memory when the operation mode of RLC is AM (Acknowledge Mode) and determining to release a second size of memory when the operation mode of RLC is UM (Unacknowledge Mode); and
   releasing the determined size of memory from a lowest ranked one of said ranked reordering buffers when it is judged that memory-release is necessary.

2. The memory release method according to claim 1, wherein, as a premise of said ranking, matching of the plurality of reordering buffers to the QoS information is carried out under a predefined rule.

3. The memory release method according to claim 1, wherein matching of the plurality of reordering buffers to the QoS information is autonomously judged using the QoS information on a Packet Data Protocol (PDP) establishment procedure on which the receiver apparatus and a network coordinate.

4. A receiver apparatus of HSDPA (High Speed Downlink Packet Access) data transmission scheme, comprising:
   means for receiving a plurality of data units from a transmitter apparatus, wherein each of the plurality of data units include a sequence number;
   a plurality of reordering buffers, each configured to store the received plurality of data units, and reorder each of the plurality of data units based on the sequence numbers included in each of the plurality of data units;
   means for ranking each of the plurality of reordering buffers on the basis of Quality of Service (QoS) QoS information indicating a traffic class of the data units stored in the reordering buffers;
   means for judging that said reordering buffers need memory-release;
   means for determining a size of memory to be released in accordance with an operation mode of RLC (Radio Link Control) by determining to release a first size of memory when the operation mode of RLC is AM (Acknowledge Mode) and determining to release a second size of memory when the operation mode of RLC is UM (Unacknowledge Mode);
   means for releasing the determined size of memory from a lowest ranked one of said ranked reordering buffers when it is judged that memory-release is necessary; and
   means for allocating the reordering buffer, whose memory is released, to be used for new reception data.

5. The receiver apparatus according to claim 4, wherein, as a premise of said ranking, matching of the plurality of reordering buffers to the QoS information is carried out under a predefined rule.

6. The receiver apparatus according to claim 4, wherein said means for ranking judges the matching of the plurality of reordering buffers to QoS information using the QoS information on a Packet Data Protocol (PDP) establishment procedure on which the receiver apparatus and a network coordinate.

7. The receiver apparatus according to claim 4, wherein said means for judging judges that it is necessary to release the memory, when detecting a situation where an amount of each of said reordering buffers used exceeds a specified value.

8. A receiver apparatus of HSDPA (High Speed Downlink Packet Access) data transmission scheme, comprising:
   a receiver configured to receive a plurality of data units from a transmitter apparatus, wherein each of the plurality of data units include a sequence number;
   a plurality of reordering buffers, each configured to store the received plurality of data units, and reorder each of the plurality of data units based on the sequence numbers included in each of the plurality of data units;
   a ranking unit configured to rank each of a plurality of reordering buffers based on QoS information indicating a traffic class of the data units stored in the reordering buffers;
   a judgment unit configured to judge that said reordering buffers need memory-release, and to determine a size of memory to be released in accordance with an operation mode of RLC (Radio Link Control) by determining to release a first size of memory when the operation mode of RLC is AM (Acknowledge Mode) and determining to release a second size of memory when the operation mode of RLC is UM (Unacknowledge Mode);

a memory release unit configured to release the determined size of memory from a lowest ranked one of said ranked reordering buffers when it is judged that memory-release is necessary; and an allocating unit configured to allocate the reordering buffer, whose memory is released, to be used for new reception data.

9. The memory release method according to claim 2, wherein said matching of the plurality of reordering buffers to the QoS information indicating a traffic class includes matching each of the plurality of reordering buffers to one of an interactive traffic class, a streaming traffic class and a background traffic class.

10. The memory release method according to claim 9, wherein the ranking includes ranking a reordering buffer matched to the interactive traffic class to a first rank, ranking a reordering buffer matched to the streaming traffic class to a second rank lower than the first rank, and ranking a reordering buffer matched to the background traffic class to a third rank lower than the second rank.

11. The receiver apparatus according to claim 5, wherein said matching of the plurality of reordering buffers to the QoS information indicating a traffic class includes matching each of the plurality of reordering buffers to one of an interactive traffic class, a streaming traffic class and a background traffic class.

12. The receiver apparatus according to claim 11, wherein the means for ranking ranks a reordering buffer matched to the interactive traffic class to a first rank, ranking a reordering buffer matched to the streaming traffic class to a second rank lower than the first rank, and ranking a reordering buffer matched to the background traffic class to a third rank lower than the second rank.

13. The receiver apparatus according to claim 8, further comprising:

a matching unit configured to match each of the plurality of reordering buffers to the QoS information indicating a traffic class by matching each of the plurality of reordering buffers to one of an interactive traffic class, a streaming traffic class and a background traffic class.

14. The receiver apparatus according to claim 13, wherein the ranking unit is configured to rank a reordering buffer matched to the interactive traffic class to a first rank, ranks a reordering buffer matched to the streaming traffic class to a second rank lower than the first rank, and ranks a reordering buffer matched to the background traffic class to a third rank lower than the second rank.

* * * * *